United States Patent
Li et al.

(10) Patent No.: US 7,989,085 B2
(45) Date of Patent: Aug. 2, 2011

(54) HOUSING OF ELECTRONIC DEVICE AND ELECTRONIC DEVICE USING THE SAME

(75) Inventors: Bin Li, Shenzhen (CN); Chao-Hsun Lin, Taipei (TW); Jen-Lung Huang, Taipei (TW); Xian-Liang Liu, Shenzhen (CN); Gui-Yun Yang, Shenzhen (CN)

(73) Assignees: Shenzhen Futaihong Precision Industry Co., Ltd., ShenZhen, Guangdong Province (CN); FIH (Hong Kong) Limited, Kowloon (KH)

( * ) Notice: Subject to any disclaimer, the term of this patent is extended or adjusted under 35 U.S.C. 154(b) by 321 days.

(21) Appl. No.: 12/275,315

(22) Filed: Nov. 21, 2008

(65) Prior Publication Data

US 2010/0028709 A1    Feb. 4, 2010

(30) Foreign Application Priority Data

Jul. 31, 2008    (CN) .......................... 2008 1 0303278

(51) Int. Cl.
*B21D 39/00*    (2006.01)
*B32B 15/00*    (2006.01)

(52) U.S. Cl. .......... 428/614; 428/636; 428/687; 174/50; 174/520; 361/679.02; 361/679.3; 361/679.01; D14/250; D14/341; D14/345

(58) Field of Classification Search .................. 428/614, 428/636, 687; 174/50, 520; 361/679.02, 361/679.3, 679.01; D14/250, 341, 345
See application file for complete search history.

(56) References Cited

U.S. PATENT DOCUMENTS

| | | | |
|---|---|---|---|
| 4,785,136 A * | 11/1988 | Mollet et al. .................. 174/363 |
| 6,576,832 B2 * | 6/2003 | Svarfvar et al. ................ 174/392 |
| 6,738,265 B1 * | 5/2004 | Svarfvar et al. ................ 361/818 |
| 2006/0098411 A1 * | 5/2006 | Lee et al. ...................... 361/704 |
| 2008/0225468 A1 * | 9/2008 | Huang et al. .................. 361/679 |
| 2009/0110853 A1 * | 4/2009 | Chiang ........................ 428/34.7 |

* cited by examiner

*Primary Examiner* — Norca L Torres-Velazquez
(74) *Attorney, Agent, or Firm* — Steven M. Reiss

(57) ABSTRACT

An exemplary housing of electronic device includes a metallic main body and a metallic three-dimensional woven member formed on at least a part of a surface of the metallic main body. An electronic device using the housing is also provided. The housing of the electronic device has a textured touching feeling.

18 Claims, 2 Drawing Sheets

HOUSING OF ELECTRONIC DEVICE AND ELECTRONIC DEVICE USING THE SAME

BACKGROUND

1. Technical Field

The present disclosure relates to electronic devices, particularly, to a housing of the electronic device.

2. Description of the Related Art

With the development of information technology, portable devices such as notebook computers, mobile phones, and personal digital assistants have become increasingly popular.

Metallic housings are often used to protect and decorate these portable electronic devices. A typical method for preparing a typical metallic housing includes the following steps. First, a metallic sheet is processed by punching, casting, or an inserted molding technique to form a semi-manufactured housing having a predetermined shape. Next, the semi-manufactured housing is anodized to form a protective layer with a metallic luster. Finally, paint is sprayed onto the semi-manufactured housing to decorate and protect the housing. However, the typical metallic housing described above is a flat structure, and it is difficult to form textured configurations on the metallic housing described above. Thus, the metallic housing cannot have a textured touching feeling.

What is needed, therefore, is a new housing of an electronic device to overcome the above-described shortcomings.

BRIEF DESCRIPTION OF THE DRAWINGS

Many aspects of the present housing of electronic device can be better understood with reference to the following drawings. The components in the drawings are not necessarily drawn to scale, the emphasis instead being placed upon clearly illustrating the principles of the present method. Moreover, in the drawings, like reference numerals designate corresponding parts throughout the several views.

DETAILED DESCRIPTION OF THE PREFERRED EMBODIMENTS

Figure 1:
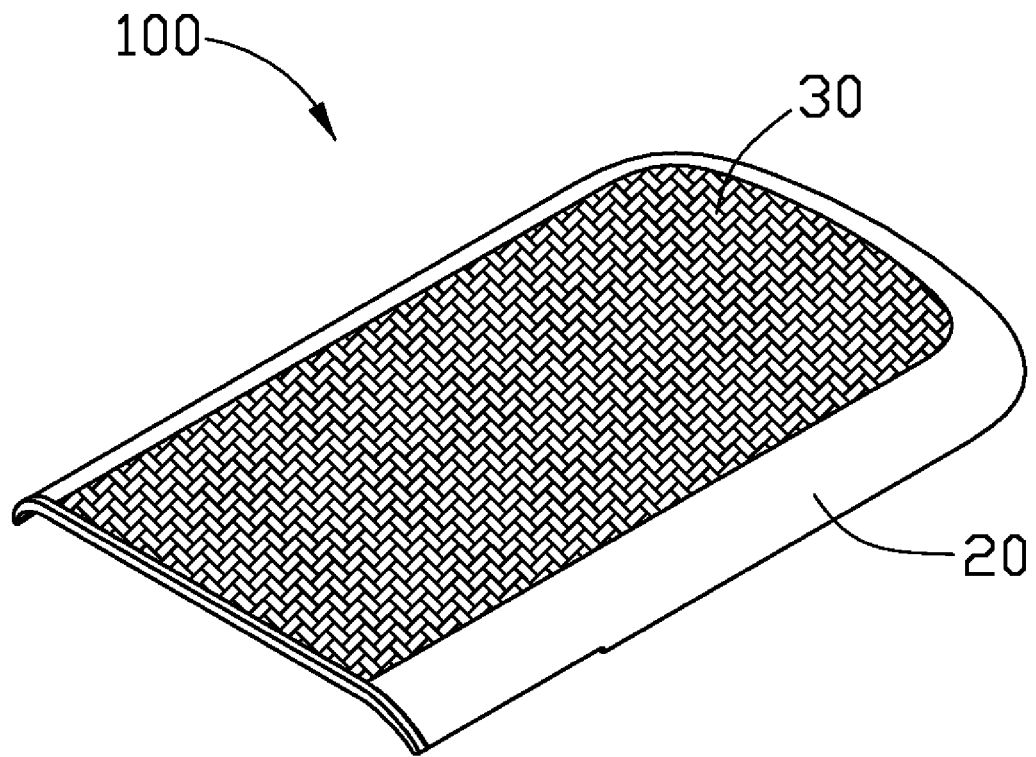
FIG. 1 is an assembled isometric view of one embodiment of a housing of an electronic device.

Referring to FIG. 1, one embodiment of a housing 100 of an electronic device includes a metallic main body 10, a protecting cover 20, and a metallic three-dimensional woven member 30. The metallic three-dimensional woven member 30 is fixed between the metallic main body 10 and the protecting cover 20. In this embodiment, the housing 100 is used for a mobile phone.

Figure 2:
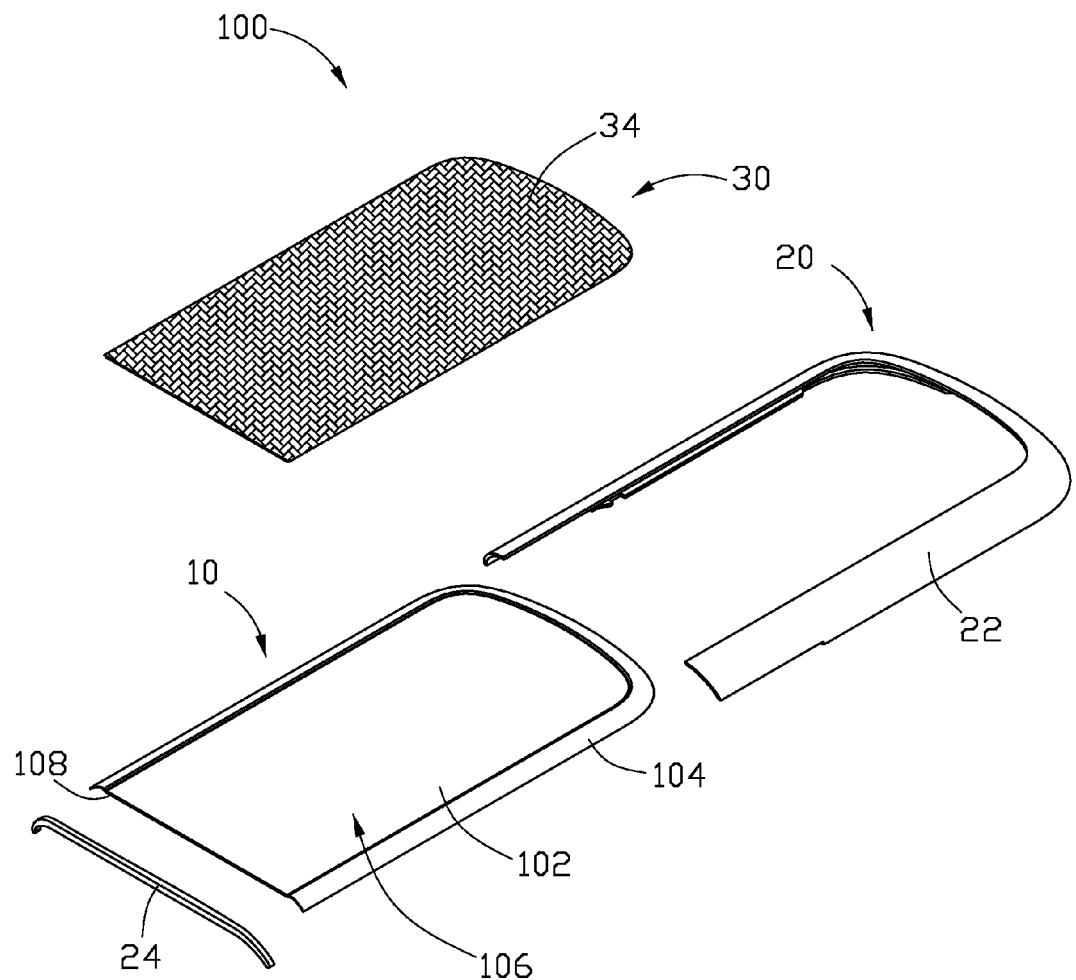
FIG. 2 is an exploded isometric view of the housing of FIG. 1.

Referring to FIG. 2, the main body 10 includes a flat surface 102 and a U-shaped flange 104 extending out from all edges of the flat surface 102 except at a free end 108. The surface 102 and the U-shaped flange 104 cooperatively define a fixing space 106 for receiving the woven member 30. The fixing space 106 may be formed by a punching process or a chemical corrosion process.

The woven member 30 may be fixed in the fixing space 106 of the metallic main body 10 by a laser welding or a power bonding method. The woven member 30 may be a metallic three-dimensional oven net or a metallic three-dimensional woven sheet prepared by woven metallic threads or metallic elongated sheets. Both the main body 10 and the metallic three-dimensional woven member 30 may be made of a magnesium alloy, a titanium alloy, and a stainless steel. In the illustrated embodiment, the woven member 30 is a metallic three-dimensional woven sheet woven by a plurality of metallic elongated sheets 34, and the main body 10 and the woven member 30 are made of stainless steel.

In the illustrated embodiment, a width of each metallic elongated sheet 34 is in a range from about 1 millimeter to about 1.2 millimeters. A thickness of each metallic elongated sheet 34 is about 0.25 millimeters. A pitch of adjacent metallic elongated sheets 34 is less than about 0.7 millimeters. In this embodiment, a width of each metallic elongated sheet 34 is about 1 millimeter. A thickness of each metallic elongated sheet 34 is about 0.25 millimeters. A pitch of adjacent metallic elongated sheets 34 is about 0.5 millimeters.

The protecting cover 20 includes a U-shaped unit 22 and a seal unit 24. The U-shaped unit 22 is configured to cover the U-shaped flange 104 and a periphery of the metallic three-dimensional woven member 30. The seal unit 24 may be welded to the free end of the metallic main body 10 with the metallic three-dimensional woven member 30. The U-shaped unit 22, the seal unit 24, and the main body 10 cooperatively fix and protect the woven member 30.

In alternative embodiments, the U-shaped flange 104 of the main body 10, and the U-shaped unit 22 of the protecting cover 20 may be other shapes which are consistent with an outline of the main body 10.

Compared with the typical electronic device, the housing 100 has an appealing appearance and a textured touching feeling due to the woven member 30.

It should be pointed out that the protecting cover 20 can be omitted, if the woven member 30 may be tightly fixed to the main body 10. In addition, the metallic three-dimensional woven member 30 may have any configuration.

Finally, while the present disclosure has been described with reference to particular embodiments, the description is illustrative of the disclosure and is not to be construed as limiting the disclosure. Therefore, various modifications can be made to the embodiments by those skilled in the art without departing from the true spirit and scope of the disclosure as defined by the appended claims.

What is claimed is:

1. A housing of an electronic device, comprising a metallic main body, a protecting cover and a metallic three-dimensional woven member fixed on at least a part of a surface of the main body; the protecting cover covering a whole peripheral edge of the woven member, the protecting cover including a seal unit welded to one end of the main body for fixing the woven member to the main body and protecting the woven member, the metallic three-dimensional woven member allowing the housing to have a textured feel.

2. The housing of claim 1, wherein the main body comprises a surface and a U-shaped flange extending out from at least one edge of the surface, the surface and the U-shaped flange cooperatively define a fixing space for receiving the woven member.

3. The housing of claim 1, wherein the woven member is selected from the group consisting of a metallic three-dimensional woven net and a metallic three-dimensional woven sheet formed by woven metallic threads or metallic elongated sheets.

4. The housing of claim 3, wherein a width of each metallic elongated sheet is in a range from about 1 millimeter to about 1.2 millimeters.

5. The housing of claim 3, wherein a thickness of each metallic elongated sheet is about 0.25 millimeters.

6. The housing of claim 3, wherein a pitch of adjacent metallic elongated sheets is less than 0.7 millimeters.

7. The housing of claim 2, wherein the protecting cover further includes a U-shaped unit, the U-shaped unit covering the U-shaped flange and includes two ends, and the seal unit connects the two ends of the U-shaped unit at the end of the main body.

8. The housing of claim 1, wherein both the main body and the woven member are made of a material selected from a group consisting of magnesium alloy, titanium alloy, and stainless steel.

9. An electronic device, comprising:
a housing comprising a metallic main body, a protecting cover and a metallic three-dimensional woven member fixed on at least a part of a surface of the main body; the protecting cover having a U-shaped unit and a seal unit, the U-shaped unit covering three continuous edges of a periphery of the woven member the seal unit fixed to the main body and the U-shaped unit and covering another edge of the woven member; and
a plurality of electronic components fixed in the housing.

10. The electronic device of claim 9, wherein the main body comprises a surface and a U-shaped flange extending out from at least one edge of the surface, the surface and the U-shaped flange cooperatively define a fixing space for receiving the woven member.

11. The electronic device of claim 9, wherein the woven member is selected from the group consisting of a metallic three-dimensional woven net and a metallic three-dimensional woven sheet formed by woven metallic threads or metallic elongated sheets.

12. The electronic device of claim 11, wherein a width of each metallic elongated sheet is in a range from about 1 millimeter to about 1.2 millimeters.

13. The electronic device of claim 11, wherein a thickness of each metallic elongated sheet is about 0.25 millimeters.

14. The electronic device of claim 11, wherein a pitch of adjacent metallic elongated sheets is less than 0.7 millimeters.

15. The electronic device of claim 10, the U-shaped unit covers the U-shaped flange; and the seal unit is welded to a free end of the main body with the woven member.

16. The electronic device of claim 9, wherein both the main body and the woven member are made of a material selected from a group consisting of magnesium alloy, titanium alloy, and stainless steel.

17. The electronic device of claim 1, wherein the woven member consists of a group of first parallel elongated sheets and a group of second parallel elongated sheets, each first elongated sheet/second elongated sheet woven by a plurality of the second elongated sheets/the first elongated sheets.

18. The electronic device of claim 9, wherein the woven member consists of a group of first parallel elongated sheets and a group of second parallel elongated sheets, each first elongated sheet/second elongated sheet woven by a plurality of the second elongated sheets/the first elongated sheets.

* * * * *